US010905956B2

(12) United States Patent
Fajt et al.

(10) Patent No.: US 10,905,956 B2
(45) Date of Patent: Feb. 2, 2021

(54) SYSTEMS AND METHODS PROVIDING TEMPORARY DECOUPLING OF USER AVATAR SYNCHRONICITY FOR PRESENCE ENHANCING EXPERIENCES

(71) Applicant: Rec Room Inc., Seattle, WA (US)

(72) Inventors: Nicholas Fajt, Seattle, WA (US);
Cameron Brown, Seattle, WA (US);
Dan Kroymann, Seattle, WA (US);
Omer Bilal Orhan, Seattle, WA (US);
Johnathan Bevis, Seattle, WA (US);
Joshua Wehrly, Seattle, WA (US)

(73) Assignee: Rec Room Inc., Seattle, WA (US)

( * ) Notice: Subject to any disclaimer, the term of this patent is extended or adjusted under 35 U.S.C. 154(b) by 0 days.

(21) Appl. No.: 16/313,403

(22) PCT Filed: Jun. 28, 2017

(86) PCT No.: PCT/US2017/039801
§ 371 (c)(1),
(2) Date: Dec. 26, 2018

(87) PCT Pub. No.: WO2018/005673
PCT Pub. Date: Jan. 4, 2018

(65) Prior Publication Data
US 2019/0160378 A1      May 30, 2019

Related U.S. Application Data

(60) Provisional application No. 62/355,751, filed on Jun. 28, 2016, provisional application No. 62/379,464, filed on Aug. 25, 2016.

(51) Int. Cl.
*G09G 5/00*     (2006.01)
*A63F 13/53*    (2014.01)
(Continued)

(52) U.S. Cl.
CPC ............ *A63F 13/53* (2014.09); *A63F 13/211* (2014.09); *A63F 13/212* (2014.09); *A63F 13/26* (2014.09);
(Continued)

(58) Field of Classification Search
CPC . G06F 3/01; G06F 3/011; G06F 3/012; G06F 3/015; G06F 3/0346;
(Continued)

(56) References Cited

U.S. PATENT DOCUMENTS 7,275,986 B2   10/2007   Mori et al.
8,408,982 B2    4/2013   Marty et al.
(Continued)

FOREIGN PATENT DOCUMENTS

WO     2010/075481 A1     7/2010

OTHER PUBLICATIONS

Bailenson, J.N., et al., "Transformed Social Interaction: Decoupling Representation from Behavior and Form in Collaborative Virtual Environments," Presence 13(4):428-441, Aug. 2004.
(Continued)

*Primary Examiner* — Lawrence S Galka
(74) *Attorney, Agent, or Firm* — Christensen O'Connor Johnson Kindness PLLC

(57) ABSTRACT

In some embodiments, a detecting endpoint system accessing a shared virtual environment detects a collision between a target avatar and an object within the shared virtual environment. The detecting endpoint system transmits a location change notification for a head of the target avatar. An observer endpoint system moves the head of the target avatar based on the location change notification. A target endpoint system associated with the target avatar does not move its viewpoint based on the location change notification. In some embodiments, this decoupling of viewpoint
(Continued)

from the avatar allows for a more immersive experience for all users.

19 Claims, 12 Drawing Sheets

(51) Int. Cl.
*A63F 13/26* (2014.01)
*A63F 13/211* (2014.01)
*A63F 13/5255* (2014.01)
*A63F 13/5258* (2014.01)
*A63F 13/212* (2014.01)
*A63F 13/56* (2014.01)

(52) U.S. Cl.
CPC ...... *A63F 13/5255* (2014.09); *A63F 13/5258* (2014.09); *A63F 13/56* (2014.09); *A63F 2300/8082* (2013.01)

(58) Field of Classification Search
CPC ........... G06F 3/04815; G06F 2203/012; G06T 19/003; G06T 19/006; G06T 13/20; G06T 2215/16; A63F 13/06; A63F 13/211; A63F 13/212; A63F 13/213; A63F 13/31; A63F 13/525; A63F 13/577; A63F 13/65; A63F 13/816; A63F 13/833; A63F 13/837; A63F 2300/105; A63F 2300/1087; A63F 2300/1093; A63F 2300/5553; A63F 2300/6045; A63F 2300/64; A63F 2300/65; A63F 2300/6661; A63F 2300/6669; A63F 2300/69; A63F 2300/8023; A63F 2300/8029; A63F 2300/8076; A63F 2300/8082; G02B 27/017; G02B 27/0093; G02B 2027/0138; G02B 2027/0187; G09B 9/003; H04N 13/344
See application file for complete search history.

(56) References Cited

U.S. PATENT DOCUMENTS

| | | | |
|---|---|---|---|
| 8,621,348 B2 | 12/2013 | Ramsay et al. | |
| 9,599,821 B2 | 3/2017 | Van Curen et al. | |
| 10,022,628 B1* | 7/2018 | Matsumiya | A63F 13/577 |
| 2008/0001951 A1 | 1/2008 | Marks et al. | |
| 2010/0261526 A1 | 10/2010 | Anderson et al. | |
| 2014/0125698 A1* | 5/2014 | Latta | G06F 3/011 |
| | | | 345/633 |
| 2014/0240351 A1 | 8/2014 | Scavezze et al. | |
| 2014/0274564 A1 | 9/2014 | Greenbaum | |
| 2016/0093108 A1 | 3/2016 | Mao et al. | |
| 2016/0287989 A1 | 10/2016 | Fung | |
| 2017/0148339 A1 | 5/2017 | Van Curen et al. | |

OTHER PUBLICATIONS

International Search Report and Written Opinion dated Oct. 5, 2017, issued in corresponding International Application No. PCT/US2017/039801, filed Jun. 28, 2017, 9 pages.

VideoGamer.com Staff, "Fight Night Round 3 Fact Sheet," Feb. 16, 2007, <https://www.videogamer.com/previews/fight-night-round-3-fact-sheet> [retrieved as early as Jun. 13, 2017], 10 pages.

Young, J.E., et al., "Embodied Damage Indicators in First-Person Shooting Games," research paper, University of Manitoba, Canada, Aug. 2013, 12 pages.

* cited by examiner

SYSTEMS AND METHODS PROVIDING TEMPORARY DECOUPLING OF USER AVATAR SYNCHRONICITY FOR PRESENCE ENHANCING EXPERIENCES

CROSS-REFERENCE(S) TO RELATED APPLICATION

This application claims the benefit of Provisional Application No. 62/355,751, filed Jun. 28, 2016, and Provisional Application No. 62/379,464, filed Aug. 25, 2016, the entire disclosures of which are hereby incorporated by reference herein for all purposes.

The present application is related to International Patent Application No. PCT/US2017/039799, filed Jun. 28, 2017, entitled SYSTEMS AND METHODS FOR TRANSFERRING OBJECT AUTHORITY IN A SHARED VIRTUAL ENVIRONMENT; International Patent Application No. PCT/US2017/039800, filed Jun. 28, 2017, entitled SYSTEMS AND METHOD FOR MANAGING PERMISSION FOR INTERACTING WITH VIRTUAL OBJECTS BASED ON VIRTUAL PROXIMITY; International Patent Application No. PCT/US2017/039824, filed Jun. 28, 2017, entitled SYSTEMS AND METHODS FOR ASSISTING VIRTUAL GESTURES BASED ON VIEWING FRUSTUM; and International Patent Application No. PCT/US2017/039826, filed Jun. 28, 2017, entitled SYSTEMS AND METHODS FOR DETECTING COLLABORATIVE VIRTUAL GESTURES, the entire disclosures of which are hereby incorporated by reference herein for all purposes.

BACKGROUND

Virtual environments such as virtual reality environments, augmented reality environments, and the like, are growing in popularity. For such environments to be successful, it is important for the presentation of the environment to be as immersive and interactive as possible. Difficulties in providing immersiveness along with interactivity can arise in these systems, however, particularly when multiple users are participating in the same virtual environment to create a shared virtual environment. What is desired are systems and techniques that can improve immersiveness and interactivity in shared virtual environments.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of temporarily decoupling a position of a viewpoint from a position of a head of a target avatar in a shared virtual environment is provided. A target endpoint system presents the shared virtual environment from a viewpoint at a motion-tracked position, wherein the motion-tracked position corresponds to a position of a head-mounted display device detected by a motion sensor device of the target endpoint system. An observing endpoint system presents the shared virtual environment including the head of the target avatar at the motion-tracked position. A detecting endpoint system transmits a first location change notification that includes a reaction position for the head of the target avatar. In response to receiving the first location change notification, the observing endpoint system animates the head of the target avatar from the motion-tracked position to the reaction position. In response to receiving the first location change notification, the target endpoint system maintains the viewpoint at the motion-tracked position instead of moving the viewpoint from the motion-tracked position to the reaction position.

In some embodiments, a method executed by a computing device of an endpoint system is provided. The computing device causes a head-mounted display device to present a shared virtual environment from a viewpoint rendered at a motion-tracked position, wherein the motion-tracked position corresponds to detected positions of the head-mounted display device generated by one or more motion sensors of the endpoint system. The computing device transmits at least one location change notification to cause at least one other endpoint system to present a head of an avatar associated with the endpoint system at the motion-tracked position. The computing device receives a location change notification from a detecting endpoint system, wherein the location change notification includes a reaction position for the head of the avatar that is different from the motion-tracked position. In response to receiving the location change notification from the detecting endpoint system, the computing device maintains the viewpoint at the motion-tracked position instead of moving the viewpoint from the motion-tracked position to the reaction position.

In some embodiments, a method executed by a computing device of an endpoint system is provided. The computing device receives a first location change notification from a target endpoint system that indicates a motion-tracked position at which to present a head of an avatar associated with the target endpoint system. The computing device causes the endpoint system to present a shared virtual environment including the head at the motion-tracked position. The computing device receives a second location change notification from a detecting endpoint system other than the target endpoint system that indicates a reaction position. The computing device causes the endpoint system to animate the head from the motion-tracked position to the reaction position. The computing device receives a third location change notification from the target endpoint system that indicates the motion-tracked position. The computing device causes the endpoint system to animate the head from the reaction position to the motion-tracked position.

In some embodiments, a method executed by a computing device of a detecting endpoint system is provided. The computing device receives a first location change notification from a target endpoint system that indicates a motion-tracked position within a shared virtual environment at which to present a head of an avatar associated with the target endpoint system. The computing device detects a collision between the avatar and an object for which the detecting endpoint system has object authority. The computing device transmits a second location change notification that includes a reaction position for the head.

In some embodiments, an endpoint system comprising a head-mounted display device, at least one motion sensor, and at least one computing device is provided. The at least one motion sensor is configured to detect positions of the head-mounted display device. The at least one computing device is configured to perform a method as described above.

In some embodiments, a non-transitory computer-readable medium is provided. The computer-readable medium has computer-executable instructions stored thereon that, in response to execution by one or more processors of a computing device, cause the computing device to perform a method as described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
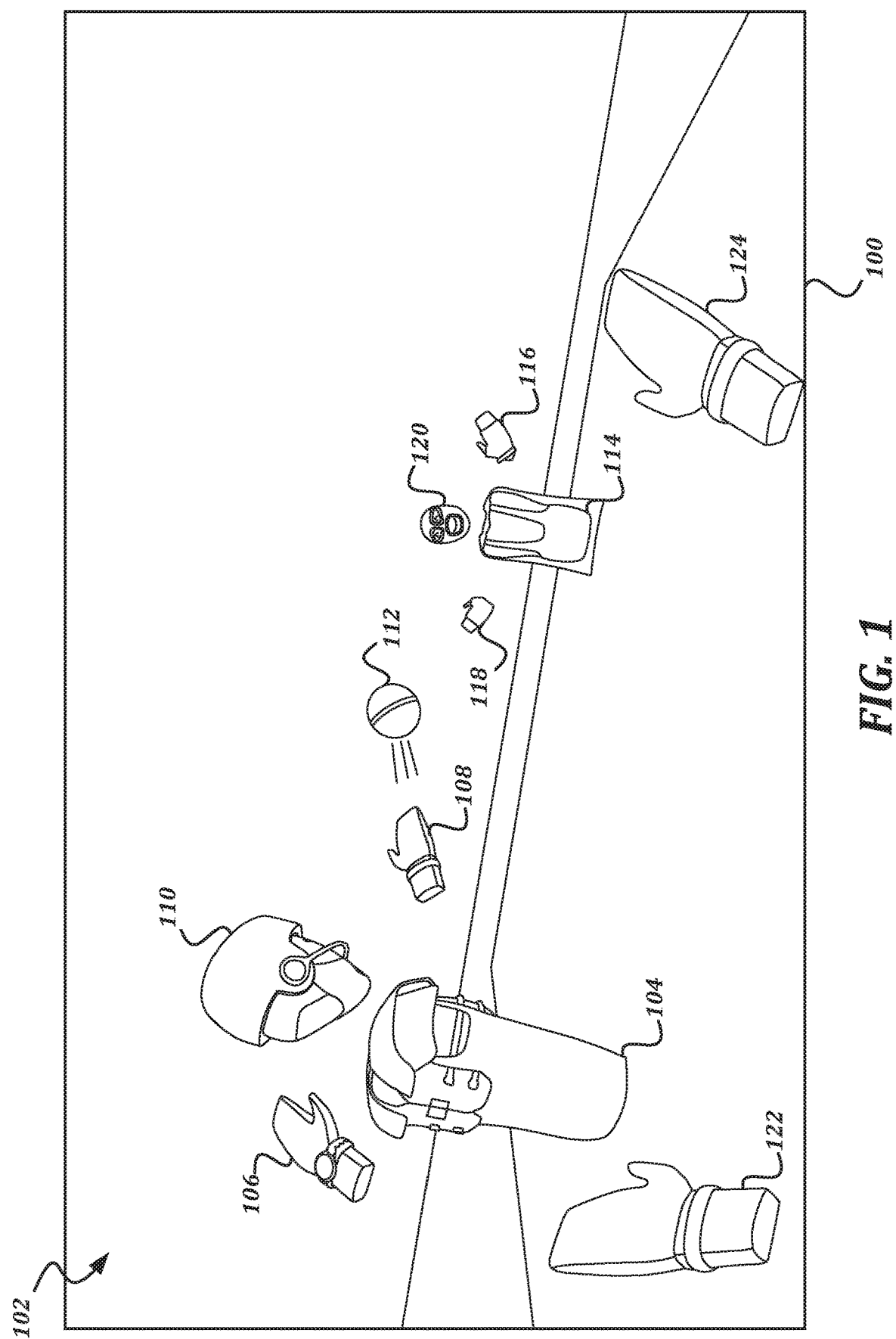
FIG. 1 is an illustration of an example embodiment of a shared virtual environment according to various aspects of the present disclosure.

FIG. 1 is an illustration of an example embodiment of a shared virtual environment according to various aspects of the present disclosure. In FIG. 1, a display 100 of a head-mounted display device is illustrated, showing a view of a shared virtual environment 102 presented to a user via the head-mounted display device. The shared virtual environment 102 is a virtual room in which two or more users may interact with each other and/or with objects within the shared virtual environment through avatars. As shown, the view is a first-person view of the shared virtual environment 102, and two avatars can be seen. A first avatar has a head 110, a torso 104, a left hand 106 and a right hand 108. A second avatar also has a head 120, a left hand 116, a right hand 118, and a torso 114. In the illustrated scene, the first avatar has just thrown a ball 112 towards the second avatar. Because the scene is a first-person view, the user can also see a left hand 122 and a right hand 124 that correspond to the user's own avatar. This scene is an illustrative example to establish context for the rest of the disclosure, and should not be seen as limiting to any specific type of avatar, object, or virtual room.

Figure 2:
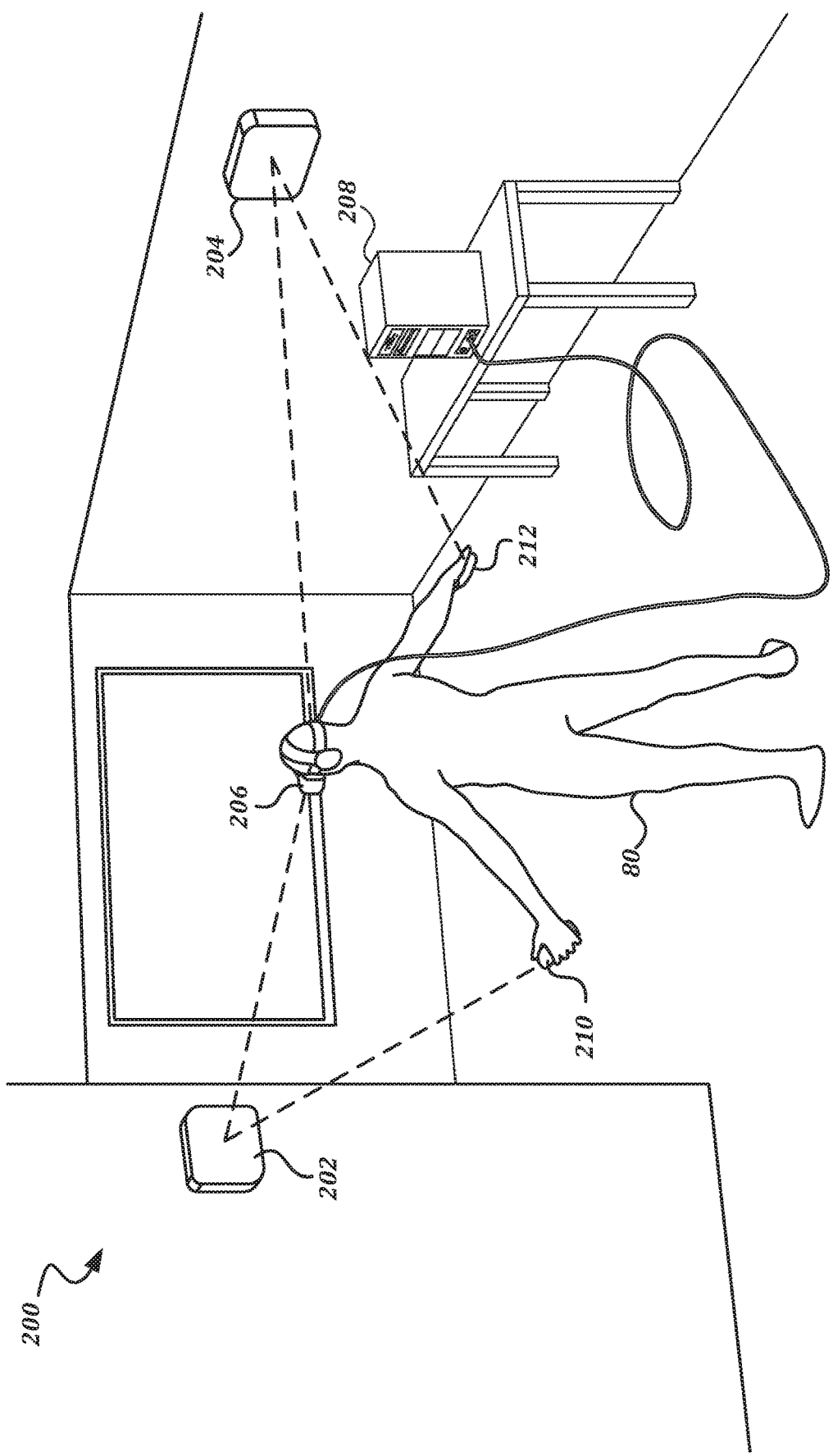
FIG. 2 is an illustration of a user interacting with an example embodiment of an endpoint system according to various aspects of the present disclosure.

Each avatar in the shared virtual environment is associated with an endpoint system. FIG. 2 is an illustration of a user interacting with an example embodiment of an endpoint system according to various aspects of the present disclosure. The user 80 is in a room 200 that has been configured with an endpoint system. An endpoint computing device 208 is connected to a head-mounted display device 206 worn by the user 80 via a cable. The user 80 holds a first handheld controller device 210 in one hand, and a second handheld controller device 212 in the other hand. One or more motion sensor devices 202, 204 are arranged around the room 200, and detect the position and/or motion of the head-mounted display device 206 and the handheld controller devices 210, 212 within the room 200. The endpoint computing device 208 may use the detected positions and/or motions of the handheld controller devices 210, 212 to control the hands of the avatar 122, 124 within the shared virtual environment 102. The endpoint computing device 208 may use the detected positions and/or motions of the head-mounted display device 206 to move the avatar associated with the endpoint system within the shared virtual environment 102, and to move the viewpoint rendered by the head-mounted display device 206 within the shared virtual environment 102. Further details regarding each of these components are provided below.

In order to provide the most immersive experience for users of the shared virtual environment, it is desirable to have the shared virtual environment mimic the real world as much as possible. For example, it is desirable to make objects within the shared virtual environment move and behave as if they are governed by the rules of Newtonian physics. In other words, if objects within the shared virtual environment collide, it is desirable for them to bounce off of each other as if both objects had mass, or to react in some other way similar to how real world objects would react. As another example, it is desirable to couple a viewpoint to a head of an avatar of a given user, such that the avatar can depict to other users what the given user is seeing within the shared virtual environment. As yet another example, it is desirable to manage the position of both the viewpoint and the head of the avatar for the given user by tracking the position of the head-mounted display device used by the given user. This gives the given user the feeling of being present within the shared virtual environment.

It quickly becomes apparent that it is difficult to achieve all of these goals at once. If an object within the shared virtual environment collides with an avatar, one would expect to see the avatar react as if the object has mass. For example, if a ball hits an avatar in the head, one would expect the head of the avatar to snap back, flinch, or otherwise react to the collision. If the head of the avatar is moved automatically by the system and the viewpoint remains coupled to the head of the avatar, then the experience can be very disorienting to the given user who is viewing the shared virtual environment from the viewpoint. However, if the head of the avatar does not move in response to the collision, the illusion of a shared virtual environment that obeys the laws of Newtonian physics is broken for other users because the avatar is not affected by the impact. It may even be hard for other users to tell if the collision actually took place if the avatar does not physically react in some way. What is needed are techniques that can both refrain from moving the viewpoint independently from the motion of the head-mounted display device to avoid disorienting the user, yet also move portions of the avatar within the shared virtual environment in response to detected collisions within the shared virtual environment.

Figure 3B:
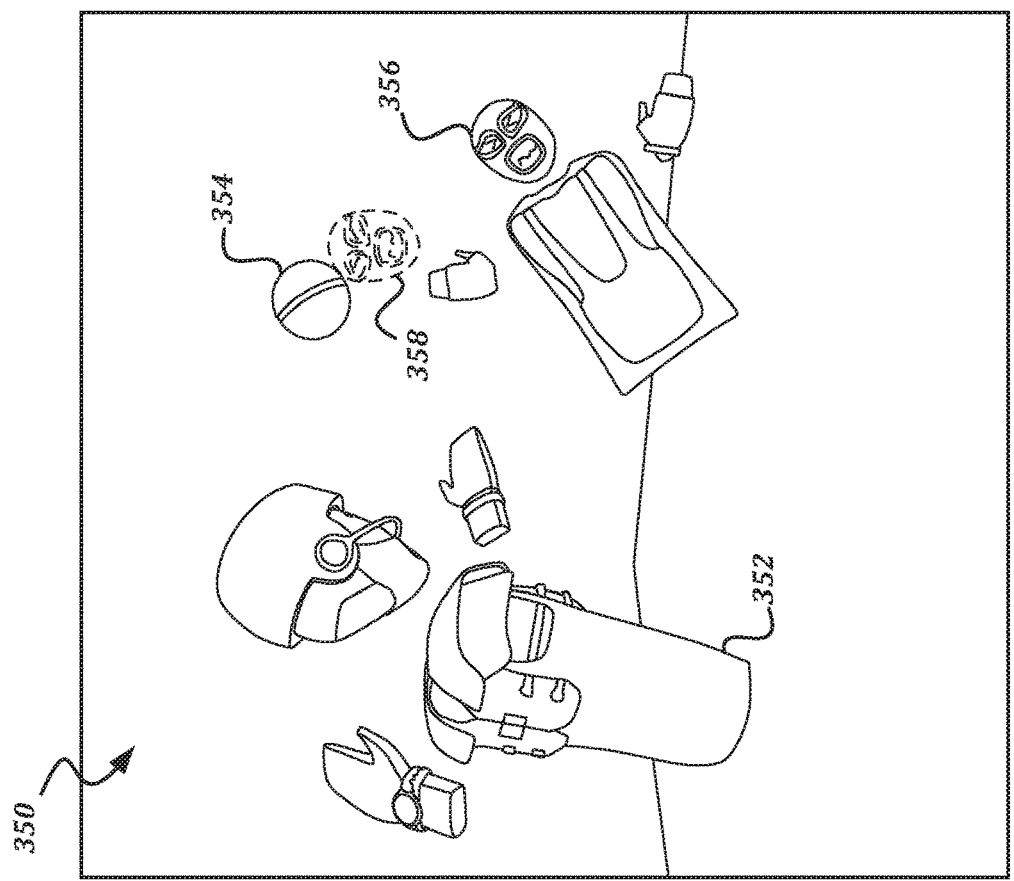
FIGS. 3A and 3B illustrate an example embodiment of activity within a shared virtual environment according to various aspects of the present disclosure.
Figure 3A:
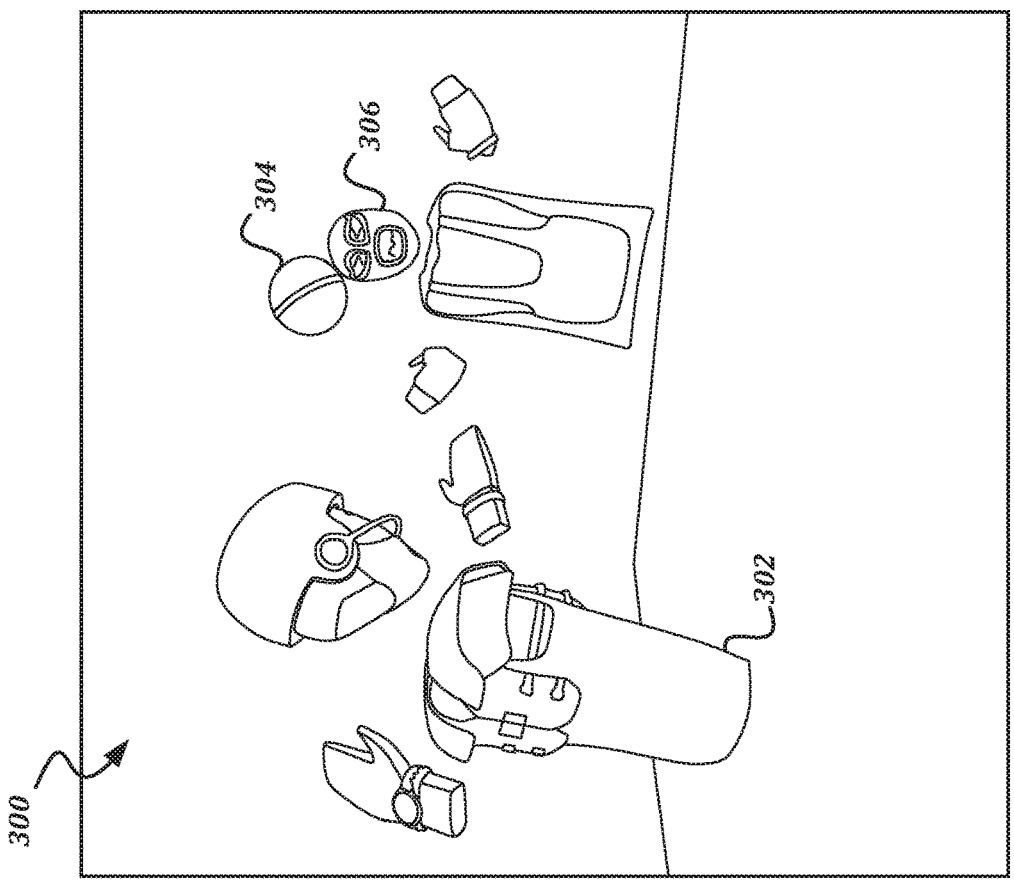

FIGS. 3A and 3B illustrate an example embodiment of activity within a shared virtual environment according to various aspects of the present disclosure. FIG. 3A illustrates a shared virtual environment 300 from a viewpoint of an observing endpoint system, where a first avatar 302 has thrown a ball 304 at a target avatar. The shared virtual environment 300 illustrated in FIG. 3A shows the instant at which the ball 304 has collided with the head 306 of the target avatar, and the problems discussed above arise. If a viewpoint of a user associated with the target avatar remains coupled to the head 306, the head 306 should not move within the shared virtual environment 300 in order to avoid disorienting the user. However, if the head 306 does not move, then other users viewing the target avatar will have a less satisfying experience.

FIG. 3B illustrates a shared virtual environment 350 from a viewpoint of an observing endpoint system, where a first avatar 352 has thrown a ball 354 at a target avatar. The shared virtual environment 350 illustrated in FIG. 3B shows a time after the ball 354 had collided with the head 356 of the target avatar. As shown, the head 356 of the target avatar has been moved automatically by the system to a new position in reaction to the collision, and the rest of the target avatar (including the torso and hands) have been moved accordingly. However, as shown in broken line, the viewpoint 358 to be presented to the user associated with the target avatar has been decoupled from the head 356. This way, both the user associate with the target avatar and other users of the shared virtual environment 350 can have the optimum experience. Eventually, the head 356 will return to the position of the viewpoint 358, and the viewpoint 358 can be recoupled to the head 356. Details regarding systems and methods for providing this functionality are provided below.

Figure 4:
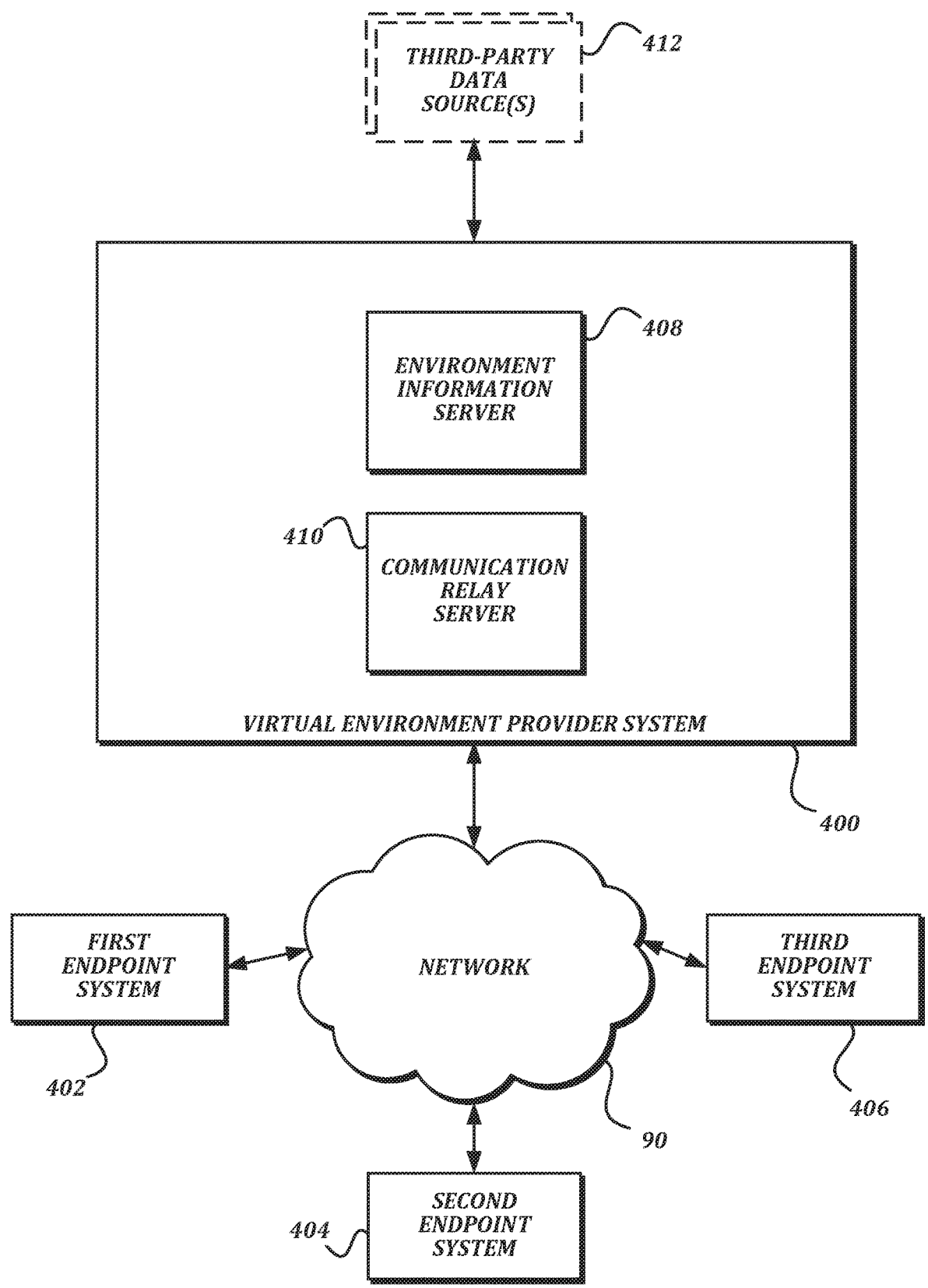
FIG. 4 is a block diagram that illustrates an example embodiment of a virtual environment provider system according to various aspects of the present disclosure.

FIG. 4 is a block diagram that illustrates an example embodiment of a virtual environment provider system according to various aspects of the present disclosure. In the illustrated embodiment, the virtual environment provider system 400 includes an environment information server 408 and a communication relay server 410.

In some embodiments, the environment information server 408 is primarily responsible for managing persistent information relating to providing the shared virtual environment. For example, the environment information server 408 may manage user account information, preferences, long-lived virtual object information, and/or other information. In some embodiments, the communication relay server 410 is primarily responsible for distributing notifications received from endpoint systems to other endpoint systems. The communication relay server 410 may also extract some data for temporary storage from the notifications that pass through it. Further description of the functionality provided by the environment information server 408 and the communication relay server 410 is provided below.

Each server of the virtual environment provider system 400 may be one or more computing devices. In some embodiments, the environment information server 408 and the communication relay server 410 may be merged to be provided by a single computing device. In some embodiments, the virtual environment provider system 400 may include a plurality of computing devices that interchangeably provide the functionality of both servers 408, 410. In some embodiments, the servers 408, 410 of the virtual environment provider system may be provided using a cloud computing service. In some embodiments, the virtual environment provider system 400 may be co-located with (or may be provided by) the same computing devices as one of the endpoint systems 402-406. In some embodiments, the virtual environment provider system 400 is remote from the endpoint systems 402-406.

In the illustrated embodiment, the virtual environment provider system 400 communicates with a plurality of endpoint systems, including a first endpoint system 402, a second endpoint system 404, and a third endpoint system 406 via a network 90. In some embodiments, there may be more or fewer than three endpoint systems communicating with each other and the virtual environment provider system 400, though three are illustrated herein in order to describe the functionality of the system. In the discussion below, the first endpoint system 402 may be referred to as a target endpoint system 402, the second endpoint system 404 may be referred to as a detecting endpoint system 404, and the third endpoint system 406 may be referred to as an observing endpoint system 406, for clarity. Connections via the network 90 may be implemented using any combination of suitable wired and/or wireless communication technology, including but not limited to Ethernet, fiber-optics, WiFi, 2G, 3G, LTE, WiMAX, and Bluetooth.

In the illustrated embodiment, the virtual environment provider system 400 may optionally communicate with one or more third-party data sources 412. Third-party data sources 412 may be run by different parties than the virtual environment provider system 400, and may be used to provide enhanced content within the virtual environment provider system 400. Some examples of third-party data sources 412 include, but are not limited to, social networking services, billing services, providers of third-party content such as virtual objects, and media providing services.

Figure 5A:
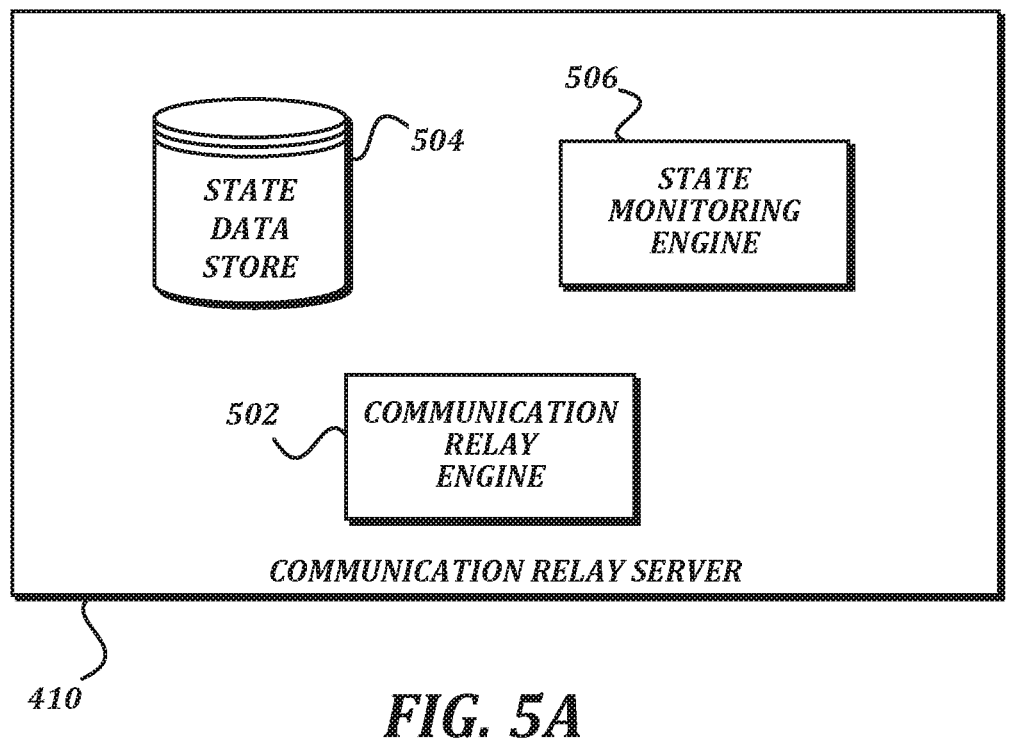
FIG. 5A is a block diagram that illustrates an example embodiment of a communication relay server according to various aspects of the present disclosure.

FIG. 5A is a block diagram that illustrates an example embodiment of a communication relay server according to various aspects of the present disclosure. Typically, bandwidth available to endpoint systems may be asymmetric. That is, a bandwidth available for upload may be significantly less than a bandwidth available for download. While this may not present a significant problem when a first endpoint system 402 and a second endpoint system 404 are the only endpoint systems, the problem arises as additional endpoint systems are added. If notifications were transmitted directly between endpoint systems (instead of via the communication relay server 410), a transmitting endpoint system would have to send an additional notification for each new endpoint system taking part in the shared virtual environment. Hence, as the number of objects for which notifications are transmitted from a first endpoint system 402 and the number of other endpoints both increase, the number of notifications that have to be transmitted by the first endpoint system 402 increases exponentially. This is likely to rapidly consume the available upload bandwidth. To solve this problem, the first endpoint system 402 can send a single notification to the communication relay server 410, and the communication relay server 410 sends it to the other endpoint systems. This helps conserve the limited upload bandwidth available to the first endpoint system 402. Further details of how this transmission may take place are provided below in FIG. 9 and the accompanying text.

In the illustrated embodiment, the communication relay server 410 includes a state monitoring engine 506, a communication relay engine 502, and a state data store 504.

In general, the word "engine," as used herein, refers to logic embodied in hardware and/or software instructions, which can be written in a programming language, such as C, C++, C#, COBOL, JAVA™, PHP, Perl, HTML, CSS, JavaScript, VBScript, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub-engines. The engines can be stored in any type of computer-readable medium or computer storage device and be stored on and executed by one or more general purpose computers, thus creating a special purpose computer configured to provide the engine.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, and/or the like. Such a data store may be likely to be used locally by the endpoint computing device 602. One example of a data store is a highly reliable, high-speed RDBMS or key-value store executing on one or more computing devices and accessible over a high-speed packet switched network. Such data stores may be likely to be used by the virtual environment provider system 400. One of ordinary skill in the art will recognize that separate data stores described herein may be combined into a single data store, and/or a single data store described herein may be separated into multiple data stores, without departing from the scope of the present disclosure.

In some embodiments, the communication relay engine 502 is configured to receive notifications from endpoint systems, and to re-transmit those notifications to other endpoint systems. In some embodiments, the state monitoring engine 506 is configured to manage state information held within the state data store 504. In some embodiments, the state monitoring engine 506 may review the notifications received by the communication relay engine 502, and may store information from the notifications in the state data store 504. In some embodiments, the state monitoring engine 506 may ignore information that is ephemeral (including but not limited to location information from location change notifications associated with moving objects), because it will change too quickly to be usefully stored. In some embodiments, the state monitoring engine 506 may wait to store location information in the state data store 504 until the location change notifications indicate that a previously moving object has come to rest. In some embodiments, the state monitoring engine 506 may store information from notifications that is not ephemeral (or at least that changes on a less-frequent basis), such as whether an avatar is present in the shared virtual environment, a score for a game being played, and/or the like. Though each endpoint system should be receiving the notifications from the communication relay engine 502, storing data in the state data store 504 allows an endpoint system that joins the shared virtual environment later to receive initial status upon joining, instead of having to wait to receive notifications from the various endpoint systems to know what objects to present.

Figure 5B:
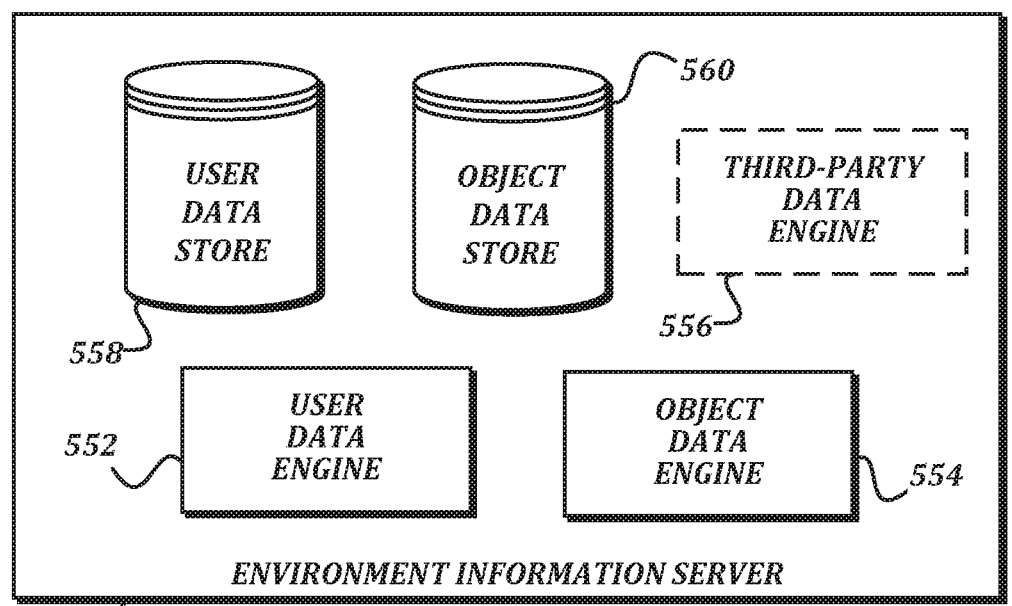
FIG. 5B is a block diagram that illustrates an example embodiment of an environment information server according to various aspects of the present disclosure.

FIG. 5B is a block diagram that illustrates an example embodiment of an environment information server according to various aspects of the present disclosure. In some embodiments, presenting the shared virtual environment will involve shared, immutable objects that can be altered by the environment provider but are otherwise static (such as walls, game logic, and/or the like). Presenting the shared virtual environment may also involve managing user settings, permissions, objects, and the like. While endpoint systems may be suitable for simulating the shared virtual environment for presentation, the intermittent connectivity of endpoint systems makes them unsuitable for managing this type of information. Accordingly, the environment information server 408 may manage and distribute such information.

In the illustrated embodiment, the environment information system 408 includes a user data engine 552, an object data engine 554, an optional third-party data engine 556, a user data store 558, and an object data store 560.

In some embodiments, the user data engine 552 is configured to manage user data within the user data store 558. Some non-limiting examples of user data include unique user identifiers, login and password information, contact information, avatar customization information, preferences, and billing information. The user data may be manipulated through interfaces in the shared virtual environment itself, or through an additional user interface (such as a web-based interface) provided by the environment information server 408.

In some embodiments, the object data engine 554 is configured to manage object data within the object data store 560. The object data may include, but is not limited to, a unique identifier of the object (or an object type); a model representing shape, mass, texture, density, and other physical attributes of the object (or object type); a default location for the object; an owner of the object; and one or more scripts defining behavior of the object.

In some embodiments, the third-party data engine 556 is configured to interact with one or more third-party data sources 412. As some non-limiting examples, the third-party data engine 556 may exchange information with a social network service to allow users within the shared virtual environment to communicate via the social network, to retrieve or upload media or other social postings, and/or for federated authentication. In some embodiments, the third-party data engine 556 may connect with a billing service in order to charge users for access to features within the shared virtual environment. In some embodiments, the third-party data engine 556 may communicate with a third-party content provider to determine whether a given user has access to particular content within the shared virtual environment, or to retrieve such content as requested by the user.

Figure 6:
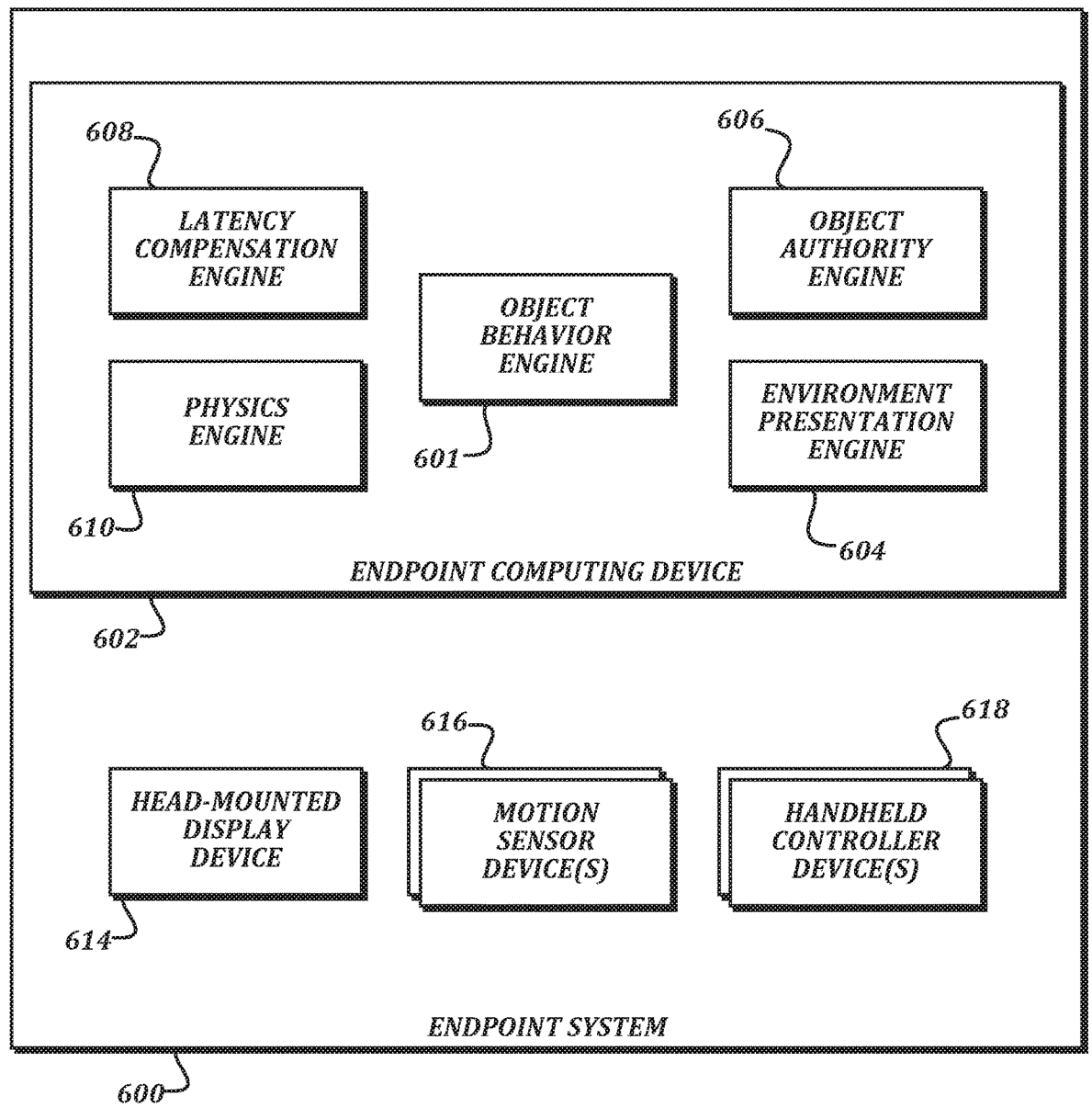
FIG. 6 is a block diagram that illustrates an example embodiment of an endpoint system according to various aspects of the present disclosure.

FIG. 6 is a block diagram that illustrates an example embodiment of an endpoint system according to various aspects of the present disclosure. In the illustrated embodiment, the endpoint system 600 includes an endpoint computing device 602, a head-mounted display device 614, one or more motion sensor devices 616, and one or more handheld controller devices 618.

In some embodiments, the endpoint computing device 602 may be a desktop computing device, a laptop computing device, a tablet computing device, a mobile computing device, or any other type of computing device capable of executing the functionality described herein. The endpoint computing device 602 may have a significant amount of computing and graphic presentation power in order to be able to both execute all of the engines and drive the presentation on the head-mounted display device 614 at a consistently high frame rate. To provide this power, the endpoint computing device 602 may have specialized processors, such as a dedicated graphics card, a physics processing unit, and/or the like.

In some embodiments, the head-mounted display device 614 includes one or more screens, and is configured to be worn on a user's head such that an immersive view of the screens is provided. The head-mounted display device 614 may also include one or more speakers (such as headphones or the like) to provide an audio presentation as well as the video presentation provided by the one or more screens. In some embodiments, the handheld controller devices 618 include one or more input devices such as buttons, trackpads, directional pads, analog sticks, capacitive sensors, and the like. In some embodiments, one of the input devices of the handheld controller devices 618 may be a trigger button. In some embodiments, the handheld controller devices 618 may detect finger states or positions without requiring buttons to be actuated. In some embodiments that are referred to as virtual reality, the head-mounted display device 614 may be opaque, and the screens are the only thing that the user sees during use. In some embodiments that are referred to as augmented reality, the head-mounted display device 614 may have a translucent or transparent display screen, and may allow the user to see objects in the real world along with the objects in the shared virtual environment.

In some embodiments, the motion sensor devices 616 independently detect motion of one or more of the head-mounted display device 614, the handheld controller devices 618, and the user. The motion sensor devices 616 may use any suitable technology to detect the motion, including but not limited to accelerometers, magnetometers, gyroscopes, infrared lasers, depth cameras, photosensors, and computer vision. In some embodiments, multiple motion sensor devices 616 may be located around a room in which the endpoint system 600 is located in order to detect the motion of the head-mounted display device 614, the handheld controller devices 618, and/or the user. In some embodiments, at least some of the motion sensor devices 616 may be incorporated into other devices (such as an accelerometer, magnetometer, and/or gyroscope integrated within the head-mounted display device 614 or handheld controller devices 618.

In some embodiments, the endpoint computing device 602 may be communicatively coupled to the head-mounted display device 614, the motion sensor devices 616, and the handheld controller devices 618 using any suitable communication technology. For example, for the connections between the endpoint computing device 602 and the head-mounted display device 614 or the motion sensor devices 616, high reliability and bandwidth may be desired, and so a suitable high-bandwidth wired communication technique (such as USB 3.0, Thunderbolt, Ethernet, and/or the like) may be used. As another example, for the connections between the endpoint computing device 602 and the handheld controller devices 618, mobility may be a greater concern than bandwidth, and so a wireless communication technique (such as Bluetooth, WiFi, radio frequency (RF) communication, and/or the like) may be used.

In some embodiments, the endpoint computing device 602 is responsible for generating the presentation of the shared virtual environment to the user, for managing the behavior of objects within the shared virtual environment as presented to the user, and for communicating state updates and other environment information with the virtual environment provider system 400 and other endpoint systems. In the illustrated embodiment, the endpoint computing device 602 is configured to provide a latency compensation engine 608, a physics engine 610, an object authority engine 606, and an environment presentation engine 604 in order to provide this functionality.

In some embodiments, the environment presentation engine 604 generates presentations of objects in the shared virtual environment to the user. In some embodiments, the environment presentation engine 604 may generate at least one video feed that includes the presentation of the objects, and provides the at least one video feed to the head-mounted display device 614 to be displayed. In some embodiments, the environment presentation engine 604 may also generate at least one audio feed to be presented via the head-mounted display device 614.

In some embodiments, the physics engine 610 provides a real-time simulation of physical behavior of the objects in the shared virtual environment. As known to one of ordinary skill in the art, a physics engine 610 may provide the simulation by conducting collision detection/collision response actions, rigid body and/or soft body dynamics, fluid dynamics, and/or other processing to determine how objects would interact within the shared virtual environment. In some embodiments, the physics engine 610 may be implemented in software executing on a CPU of the endpoint computing device 602, in software executing in a hardware-accelerated manner on a graphics processing unit (GPU), in dedicated hardware such as a physics processing unit (PPU), or in any combination thereof. Some nonlimiting examples of physics engines 610 that may be suitable for use with the endpoint system 600 include the PhysX engine by Nvidia, the Havok engine by Microsoft Corporation, and the open source Bullet engine.

In some embodiments, the object behavior engine 601 may determine non-physical behavior of objects within the shared virtual environment. As some non-limiting examples of non-physical behavior, the object behavior engine 601 may determine permissions for interacting with an object, may change object states based on game rules or logic, and may detect meaning embedded in interactions detected by the physics engine 610 and respond accordingly (e.g., providing logic that detects collaborative gestures based on object collisions; determining that a collision between a first object and a second object, such as a Frisbee and a target, indicates that a goal in a game has been achieved, and so on).

As described elsewhere herein, object authority over objects within the shared virtual environment is held by the various endpoint systems. Accordingly, the endpoint system 600 will receive location change notifications from other endpoint systems indicating how objects for which the endpoint system 600 does not have object authority should move. The transmission of these notifications will naturally be delayed by some latency in the network 90. In some embodiments, the latency compensation engine 608 is configured help compensate for this latency so that the presentation of objects by the endpoint system 600 can be substantially synchronized with the presentation of the same objects by other endpoint systems 600. In some embodiments, the latency compensation engine 608 is configured to measure latency between the endpoint system 600 and an endpoint system that transmitted a location change notification. While the physics engine 610 may be used to simulate motion of the object to the location indicated in the location change notification, the latency compensation engine 608 helps determine how stale the transmitted location is, and provides information to the physics engine 610 (or the environment presentation engine 604 to allow the animation of the object motion by the endpoint system 600 to eventually be synchronized with the authoritative object motion at the authoritative endpoint system. The latency compensation engine 608 may also help the endpoint computing device 602 compensate for lost or missed location change notifications. Detailed description of these techniques is provided below.

Because the endpoint system 600 manages object authority for objects within the shared virtual environment, in some embodiments, the object authority engine 606 is provided to do so. In some embodiments, the object authority engine 606 is configured to transmit notifications in order to take over object authority for a given object within the shared virtual environment. In some embodiments, the object authority engine 606 is configured to transmit location change notifications based on the locations generated by the physics engine 610 or the object behavior engine 601 for objects for which the endpoint system 600 has taken over object authority.

As described herein, the engines of the endpoint computing device 602 manage the shared virtual environment using a model-view-controller paradigm. That is, for any given object within the shared virtual environment, a data structure representing a model of the object is maintained by the endpoint computing device 602. The latency compensation engine 608, physics engine 610, object behavior engine 601, and object authority engine 606 make changes to the model of the object and therefore act as controllers. The environment presentation engine 604 generates a presentation based on the model of the object, and therefore acts as a view. In some embodiments, other software design paradigms may be used, and so the functionality described below may be split differently, or may be performed by different engines. In some embodiments, the engines described herein may be combined with each other. In some embodiments, multiple copies of a single engine may be present. In some embodiments, functionality described as originating from a given engine may in other embodiments be performed by a different engine.

In some embodiments, some of the devices illustrated in FIG. 6 may be combined with other devices, or some components may be in different devices than illustrated in FIG. 6. For example, in some embodiments, the physics engine 610 and/or the environment presentation engine 604 may be provided by dedicated devices separate from the endpoint computing device 602, or may be provided by the head-mounted display device 614. In some embodiments, the motion sensor devices 616 may track the hands of the user accurately enough to allow the handheld controller devices 618 to be omitted. The below description will refer to embodiments that use handheld controller devices 618 for the sake of clarity. However, the description should not be seen as limiting the disclosure this embodiment, and should instead be seen as encompassing embodiments wherein the handheld controller devices 618 are missing and corresponding user input is obtained through the motion sensor devices 616 alone.

In some embodiments, commercially available hardware may be used for the head-mounted display device 614, the motion sensor devices 616, and the handheld controller devices 618. Some nonlimiting examples of such hardware include the Rift headset and Touch controllers from Oculus VR, LLC; the HTC Vive headset and SteamVR controllers from HTC and Valve Corporation; and the HoloLens headset from Microsoft Corporation. While these examples are provided, one of ordinary skill in the art will understand that the examples are not intended to be limiting, but that other hardware from other manufacturers may instead be used in some embodiments of the present disclosure.

Figure 7:
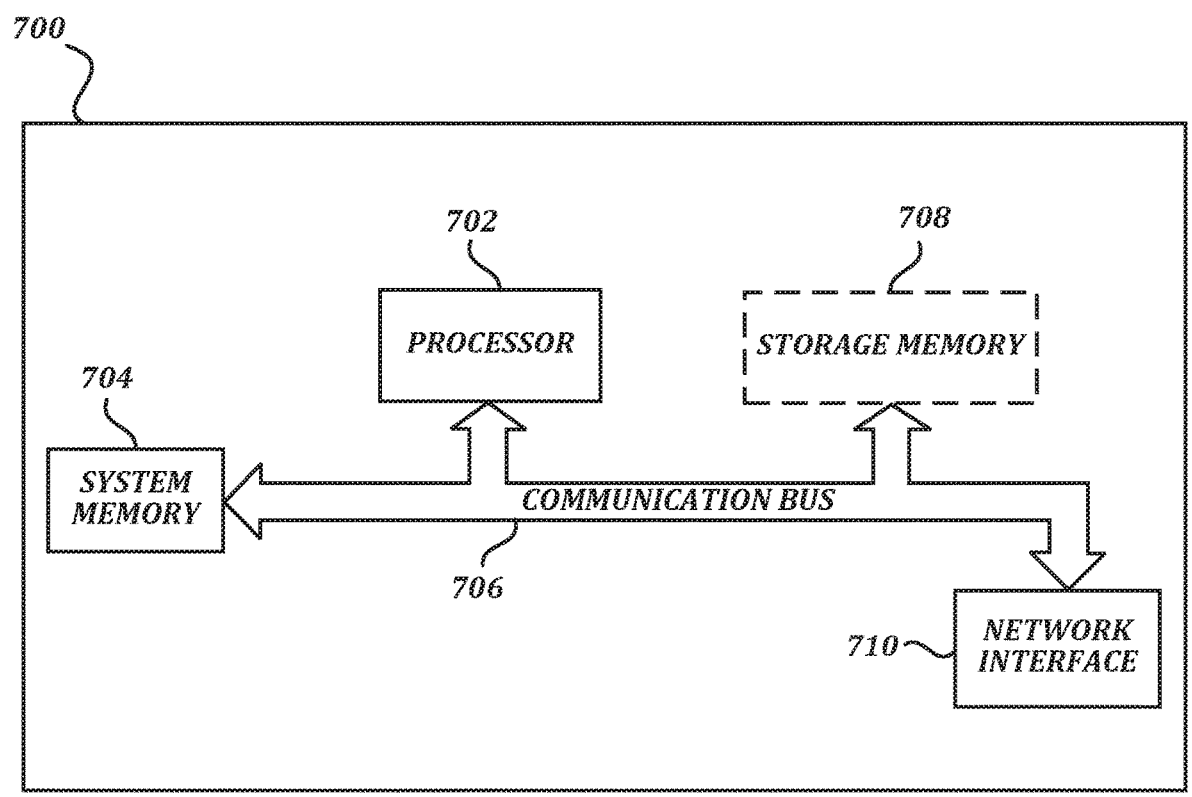
FIG. 7 is a block diagram that illustrates aspects of an exemplary computing device 700 appropriate for use with embodiments of the present disclosure.

FIG. 7 is a block diagram that illustrates aspects of an exemplary computing device 700 appropriate for use with embodiments of the present disclosure. While FIG. 7 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 700 may be any one of any number of currently available or yet to be developed devices.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or similar memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, LTE, WiMAX, Bluetooth, and/or the like.

In the exemplary embodiment depicted in FIG. 7, the computing device 700 also includes a storage medium 708. However, services may be accessed using a computing device that does not include means for persisting data to a local storage medium. Therefore, the storage medium 708 depicted in FIG. 7 is represented with a dashed line to indicate that the storage medium 708 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 704 and storage medium 708 depicted in FIG. 7 are merely examples of computer-readable media.

Suitable implementations of computing devices that include a processor 702, system memory 704, communication bus 706, storage medium 708, and network interface 710 are known and commercially available. For ease of illustration and because it is not important for an understanding of the claimed subject matter, FIG. 7 does not show some of the typical components of many computing devices. In this regard, the computing device 700 may include input devices, such as a keyboard, keypad, mouse, microphone, touch input device, touch screen, tablet, and/or the like. Such input devices may be coupled to the computing device 700 by wired or wireless connections including RF, infrared, serial, parallel, Bluetooth, USB, or other suitable connections protocols using wireless or physical connections. Similarly, the computing device 700 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

Figure 8A:
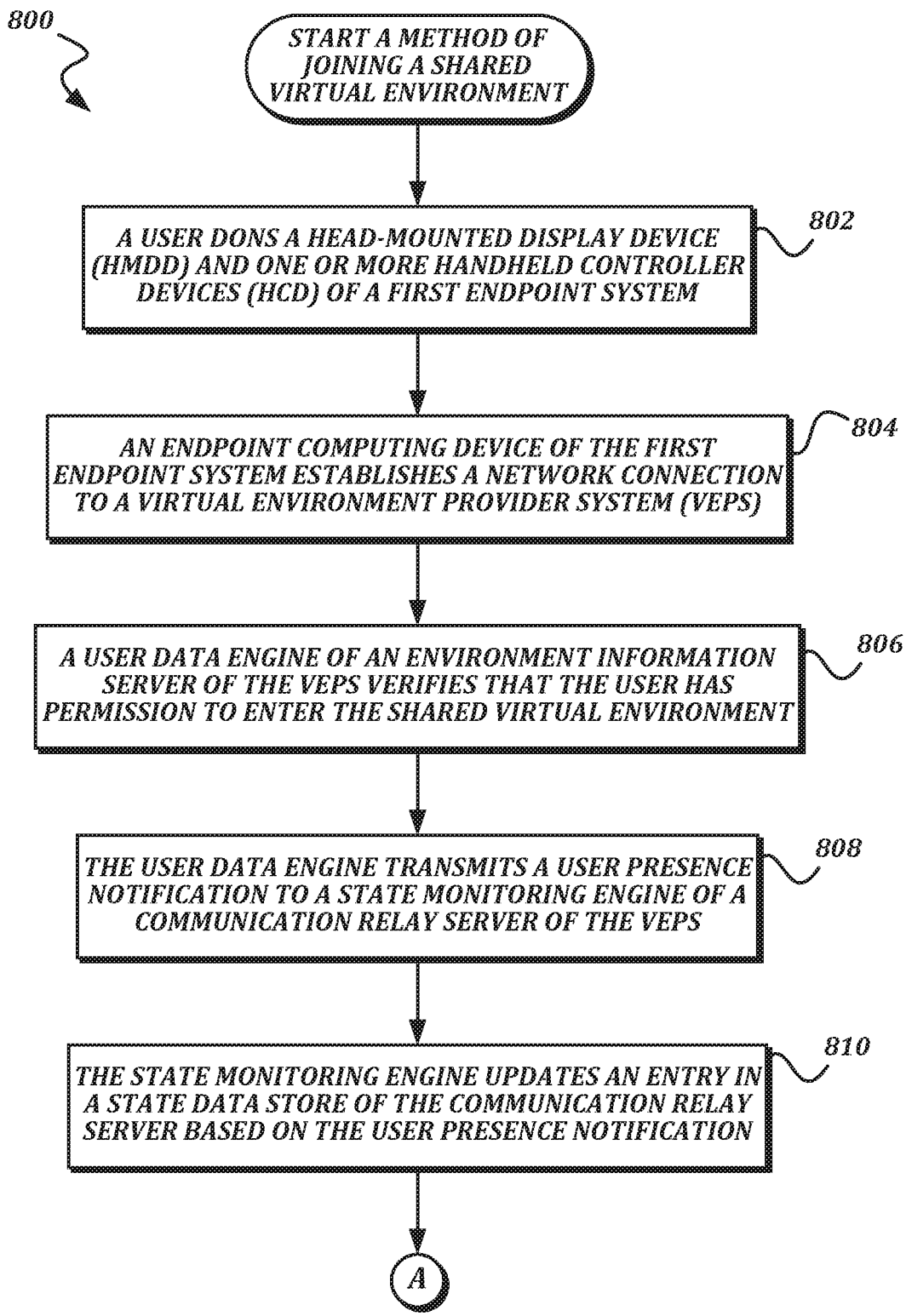
FIGS. 8A-8B are a flowchart that illustrates an example embodiment of a method of joining a shared virtual environment according to various aspects of the present disclosure.
Figure 8B:
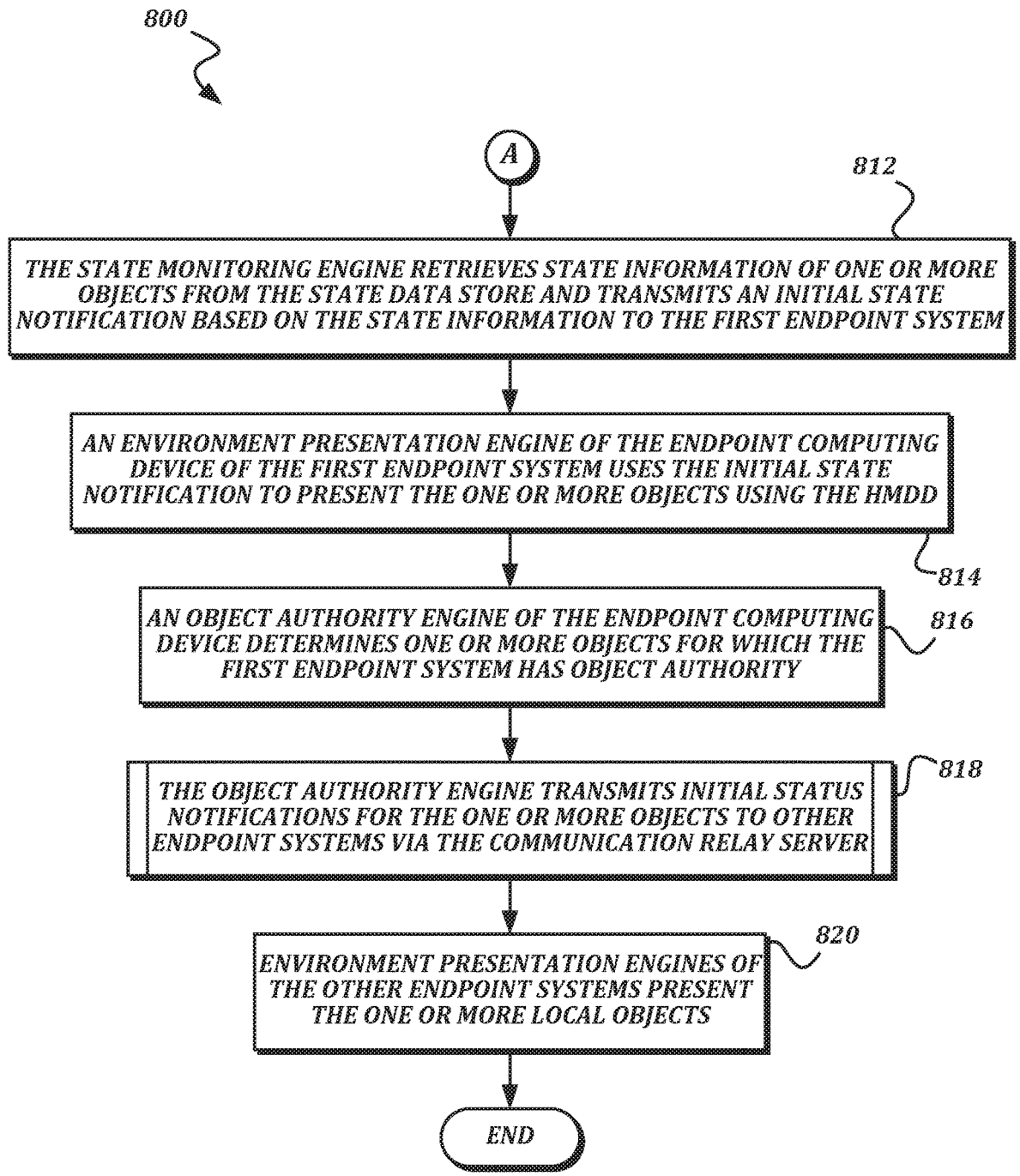

FIGS. 8A-8B are a flowchart that illustrates an example embodiment of a method of joining a shared virtual environment according to various aspects of the present disclosure. From a start block, the method 800 proceeds to block 802, where a user dons a head-mounted display device (HMDD) 614 and one or more handheld controller devices (HCD) 618 of a first endpoint system 402. At block 804, an endpoint computing device 602 of the first endpoint system 402 establishes a network connection to a virtual environment provider system (VEPS) 400. In some embodiments, establishing the network connection to the virtual environment provider system 400 may include a clock synchronization handshake, an exchange of user credentials, an exchange of encryption keys, and/or transmission of other information for establishing the connection. Next, at block 806, a user data engine 552 of an environment information server 408 of the virtual environment provider system 400 verifies that the user has permission to enter the shared virtual environment. In some embodiments, the user data engine 552 may check user credentials submitted in block 804 against an entry in the user data store 558 in order to verify permission. In some embodiments, permission may also be conditioned on aspects of the network connection itself, such as having at least a minimum amount of bandwidth and/or having no more than a maximum allowable latency.

Once permission is verified, the method 800 proceeds to block 808, where the user data engine 552 transmits a user presence notification to a state monitoring engine 506 of a communication relay server 410 of the virtual environment provider system 400. At block 810, the state monitoring engine 506 updates an entry in a state data store 504 of the communication relay server 410 based on the user presence notification. In some embodiments, storing information from the user presence notification in the state data store 504 allows the communication relay server 410 to quickly inform newly connecting endpoint systems 600 about which other endpoint systems 600 are currently participating in the shared virtual environment. The entry may include a network address (such as an IP address and/or the like) by which notifications can be sent to the first endpoint system 402.

The method 800 then proceeds to a continuation terminal ("terminal A"). From terminal A (FIG. 8B), the method 800 proceeds to block 812, where the state monitoring engine 506 retrieves state information of one or more objects from the state data store 504 and transmits an initial state notification based on the state information to the first endpoint system 402. The initial state notification may include the last stored location, velocity, and/or other aspects of the objects.

At block 814, an environment presentation engine 604 of the first endpoint system 402 uses the initial state notification to present the one or more objects using the head-mounted display device 614. The initial state notification allows the environment presentation engine 604 of the first endpoint system 402 to know where the objects should be presented within the shared virtual environment. In some embodiments, the initial state notification may include object identifiers for the objects, and the first endpoint system 402 may retrieve models, textures, logic, or other detailed information about the objects from the object data engine 554 of the environment information server 408. In some embodiments, the initial state notification may include the models, textures, logic, or other detailed information about the objects. In some embodiments, the detailed information about the objects may already be present on the first endpoint system 402, and an object identifier in the initial state notification is enough for the first endpoint system 402 to understand how to present the object.

Figure 9:
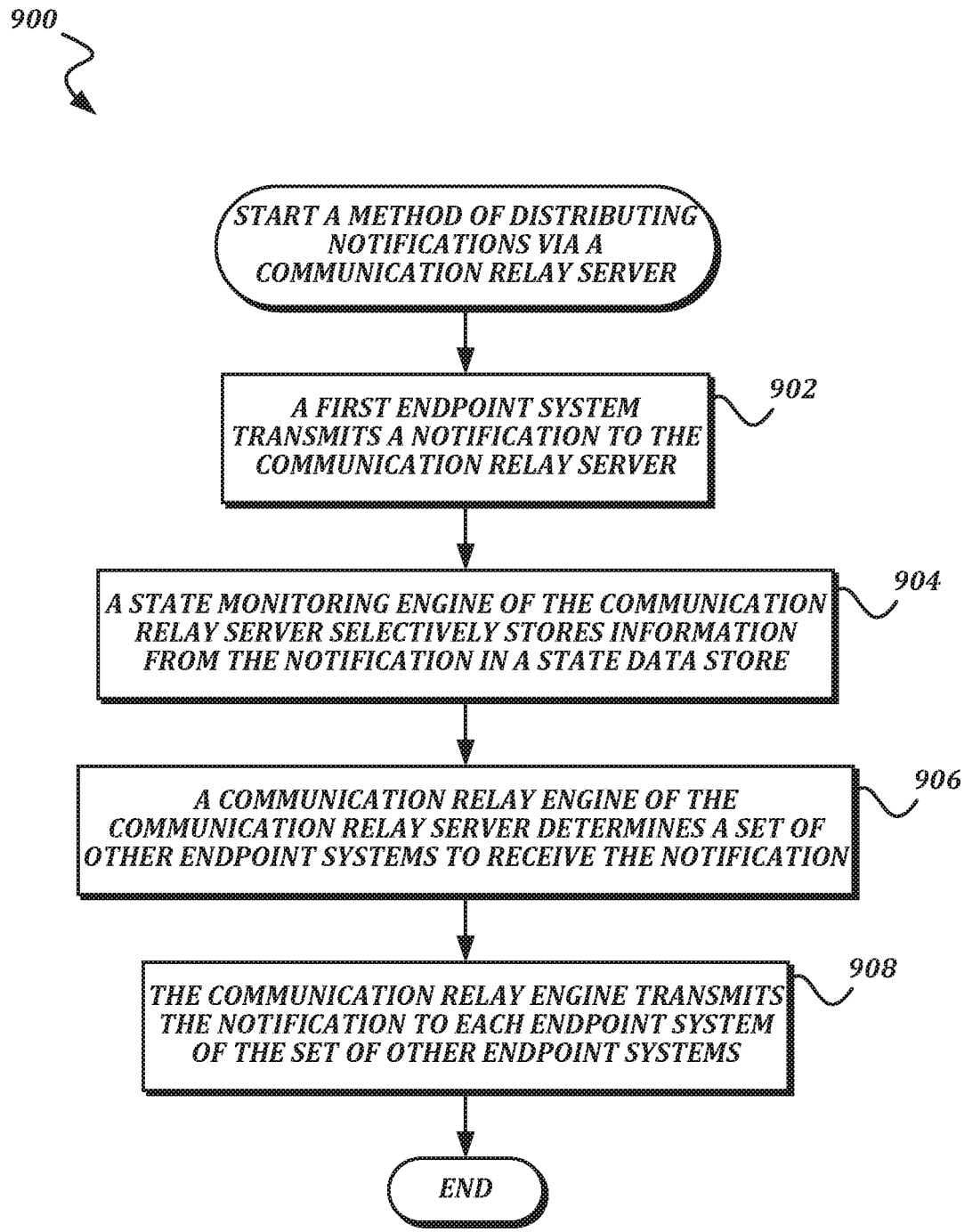
FIG. 9 is a flowchart that illustrates an example embodiment of a method of distributing notifications via a communication relay server according to various aspects of the present disclosure.

At block 816, an object authority engine 606 of the endpoint computing device 602 determines one or more objects for which the first endpoint system 402 has object authority. The objects for which the first endpoint system 402 has object authority include at least objects associated with movement of an avatar associated with the first endpoint system 402. For example, in some embodiments, the first endpoint system 402 may initially have object authority over a head object and two hand objects that are associated with the avatar. In some embodiments, the first endpoint system 402 may also initially have object authority over other objects from the initial state notification that are positioned close to the avatar. The method 800 then proceeds to procedure block 818, where the object authority engine 606 transmits initial status notifications for the one or more objects to other endpoint systems via the communication relay server 410. Any suitable technique for transmitting the notifications via the communication relay server 410 may be used. An example method suitable for use in procedure block 818 is illustrated in FIG. 9 and described in the accompanying text. At block 820, environment presentation engines 604 of the other endpoint systems 600 present the one or more local objects. The presentations on the other endpoint systems 600 use the initial status notifications to determine where to present the objects. The method 800 then proceeds to an end block and terminates. Once the method 800 has concluded, the user of the first endpoint system 402 has entered the shared virtual environment. The first endpoint system 402 will continue to present the shared virtual environment after the method 800 completes.

FIG. 9 is a flowchart that illustrates an example embodiment of a method of distributing notifications via a communication relay server according to various aspects of the present disclosure. As stated above, the method 900 is suitable for use in procedure block 818, as well as in other appropriate procedure blocks throughout the present disclosure. The method 900 may be used to reduce bandwidth requirements, particularly on asymmetric connections at the endpoint systems where upload bandwidth is more limited than download bandwidth.

From a start block, the method 900 proceeds to block 902, where a first endpoint system 402 transmits a notification to the communication relay server 410. Next, at block 904, a state monitoring engine 506 of the communication relay server 410 selectively stores information from the notification in a state data store 504. In some embodiments, the state monitoring engine 506 only stores information from notifications that are not merely ephemeral. For example, the state monitoring engine 506 may not store information from location change notifications, because the information is likely to change very quickly, and the overhead of storing the information in the state data store 504 would not be worth it. However, if the state monitoring engine 506 determines that a location change notification indicates that an object has come to rest (for example, the location information in two or more consecutive location change notifications is identical, or the velocity in a location change notification is zero), the state monitoring engine 506 may store such information in the state data store 504 because it is not likely to change soon. This may also be useful because if a new endpoint system joins the shared virtual environment after the object has come to rest, the new endpoint system would have no other way of knowing the location of the object unless the state monitoring engine stores the location in the state data store 504 and provides it with the initial state notification, because the new endpoint system would not have received any of the past location change notifications. As another example, the state monitoring engine 506 may store other information that is not as ephemeral as location, including but not limited to grab status, game scores, game event notifications, and/or the like.

At block 906, a communication relay engine 502 of the communication relay server 410 determines a set of other endpoint systems to receive the notification. In some embodiments, the communication relay engine 502 may determine which other endpoint systems are participating in the shared virtual environment by checking the entries in the state data store 504, and may use the entries to determine network addresses at which the other endpoint systems can receive communication. Next, at block 908, the communication relay engine 502 transmits the notification to each endpoint system of the set of other endpoint systems. The transmission may use the network addresses that were retrieved from the entry in the state data store 504. The method 900 then proceeds to an end block and terminates.

In the method 900, any suitable transmission technique may be used for the notifications in blocks 902 and 908. In some embodiments, the notifications may be transmitted using a connectionless transmission technique that is appropriate for time-sensitive applications. One suitable technique is the use of user datagram protocol (UDP) packets, though other techniques could be used. The description above of method 900 refers to a "first endpoint system" for clarity. One of ordinary skill in the art will recognize that this method 900 could be used by any endpoint system described herein.

Figure 10A:
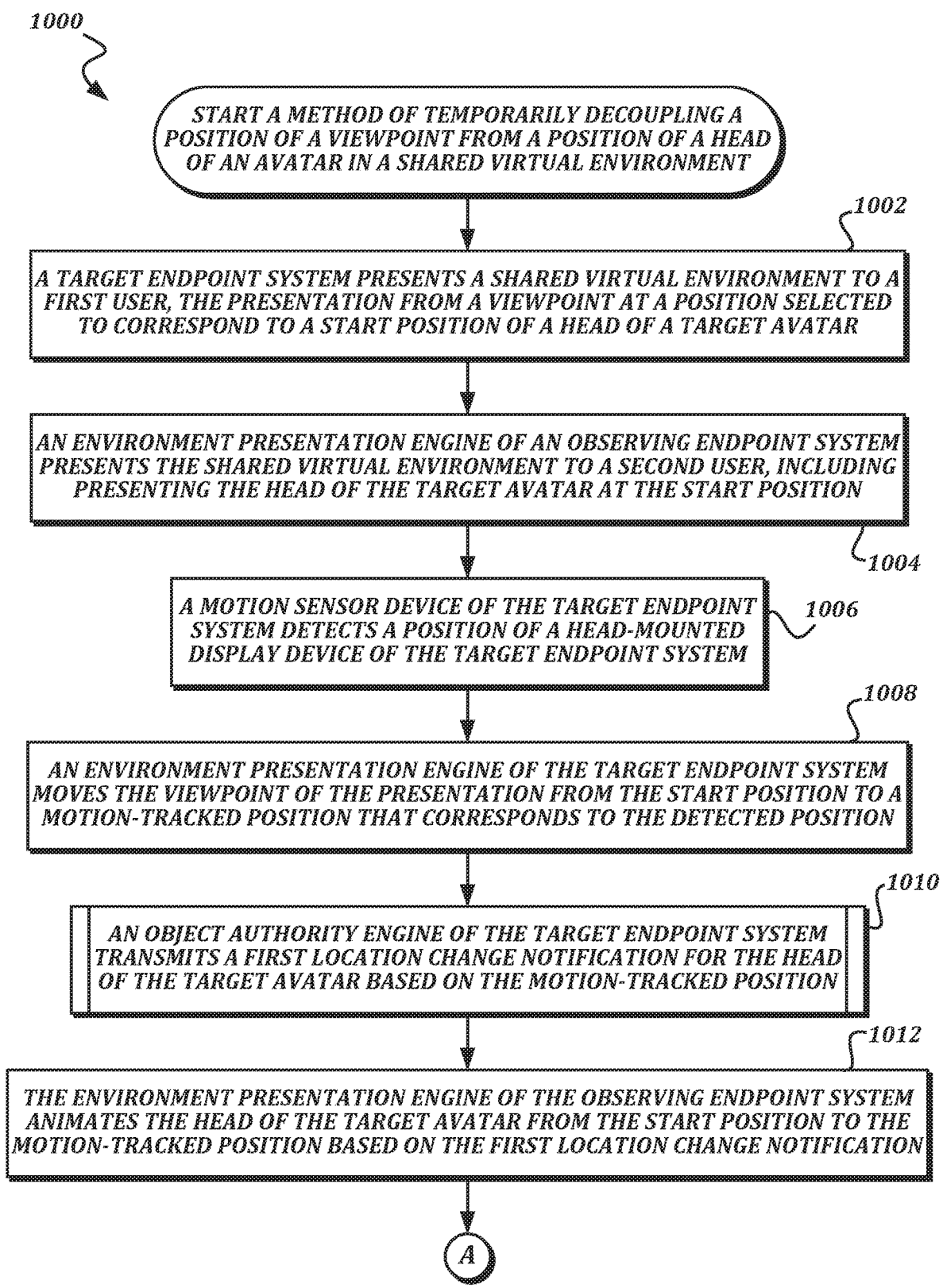
FIGS. 10A-10B are a flowchart that illustrates an example embodiment of a method of temporarily decoupling a position of a viewpoint from a position of a head of an avatar in a shared virtual environment according to various aspects of the present disclosure.
Figure 10B:
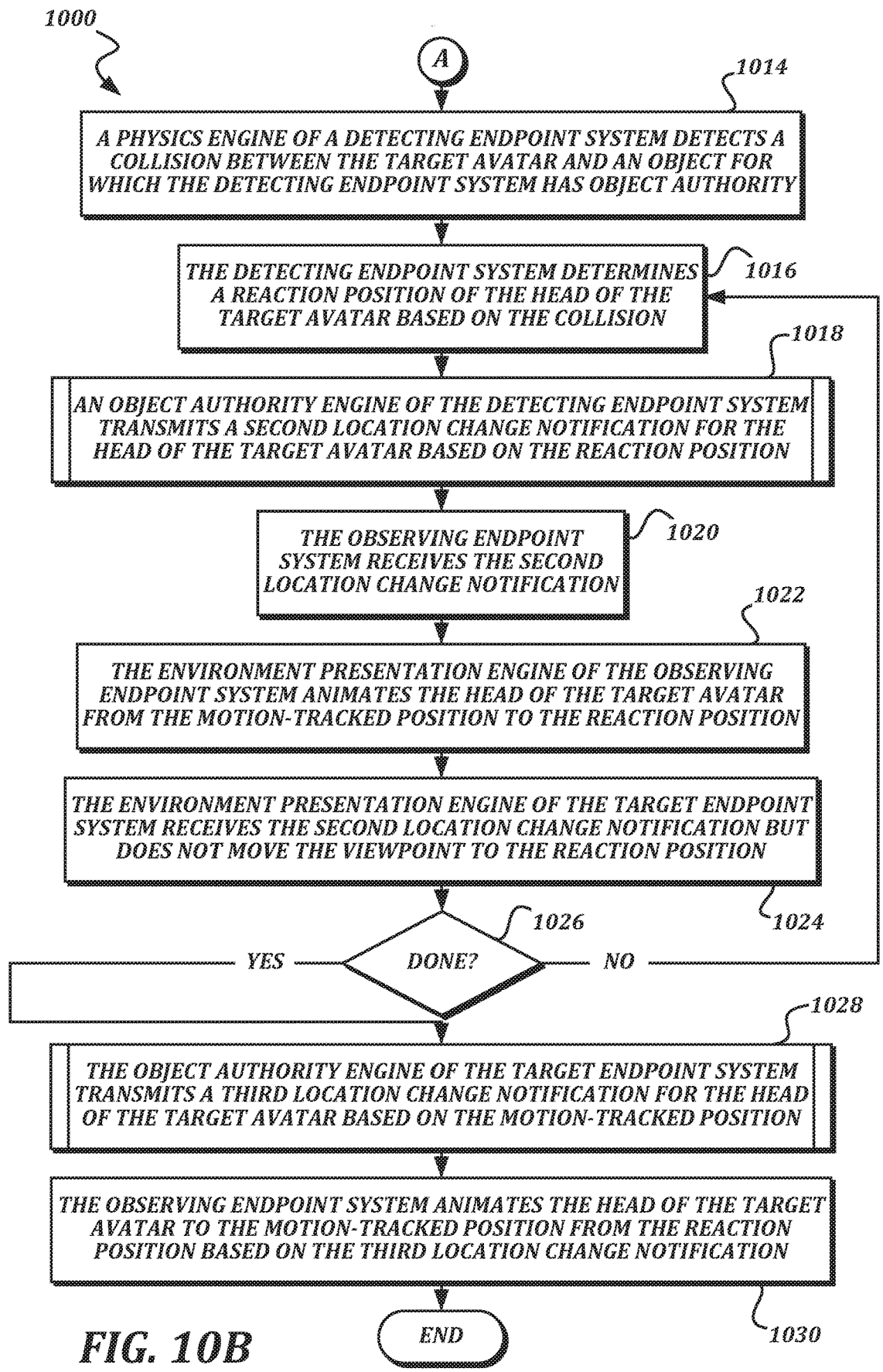

FIGS. 10A-10B are a flowchart that illustrates an example embodiment of a method of temporarily decoupling a position of a viewpoint from a position of a head of an avatar in a shared virtual environment according to various aspects of the present disclosure. The method 1000 refers to three endpoint systems such as the first endpoint system 402, the second endpoint system 404, and the third endpoint system 406 illustrated in FIG. 4 as a target endpoint system 402, a detecting endpoint system 404, and an observing endpoint system 406 to improve the clarity of the description. From a start block, the method 1000 proceeds to block 1002, where a target endpoint system 402 presents a shared virtual environment to a first user, the presentation from a viewpoint at a position selected to correspond to a start position of a head of a target avatar. In some embodiments, the presentation of the shared virtual environment to the first user is made using at least the head-mounted display device 614 of the target endpoint system 402. As used herein, positions may include at least one of a location (such as a combination of X-, Y-, and Z-coordinates in a coordinate system used to locate objects in the shared virtual environment, or a vector that includes similar information), and an orientation (such as a quarternion or an orthogonal rotation (e.g., pitch, roll, and yaw values) indicating a direction with respect to the coordinate system used to locate objects in the shared virtual environment). At block 1004, an environment presentation engine 604 of an observing endpoint system 406 presents the shared virtual environment to a second user, wherein presenting the shared virtual environment includes presenting the head of the target avatar at the start position. This will produce, on the observing endpoint system 406, a presentation similar to that illustrated in FIG. 1 (depending on how many avatars are visible in the viewpoint of the observing endpoint system 406).

Next, at block 1006, a motion sensor device 616 of the target endpoint system 402 detects a position of a head-mounted display device 614 of the target endpoint system 402. At block 1008, an environment presentation engine 604 of the target endpoint system 402 moves the viewpoint of the presentation from the start position to a motion-tracked position that corresponds to the detected position from the motion sensor device 616. In some embodiments, the environment presentation engine 604 may interpolate positions of the viewpoint between the start position and the motion-tracked position in order to provide smooth movement of the viewpoint.

At procedure block 1010, an object authority engine 606 of the target endpoint system 402 transmits a first location change notification for the head of the target avatar based on the motion-tracked position. In some embodiments, the first location change notification may include a location and orientation that correspond to the motion-tracked position. Any suitable technique for transmitting the notification may be used, including but not limited to the method of transmitting notifications to other endpoint systems via a communication relay server 410 as illustrated in FIG. 9.

The description above primarily describes movement to a single motion-tracked position to improve the clarity of discussion, but one of ordinary skill in the art will recognize that some steps may be performed repeatedly in order to further update positions with respect to the shared virtual environment. For example, in some embodiments, blocks 1006-1010 may loop continuously as motion of the head-mounted display device 614 is detected, such that the user is given the feeling of moving through the shared virtual environment in correspondence with the movement of the head-mounted display device 614.

At block 1012, the environment presentation engine 604 of the observing endpoint system 406 animates the head of the target avatar from the start position to the motion-tracked position based on the first location change notification. In some embodiments, the environment presentation engine 604 of the observing endpoint system 406 may interpolate positions between the start position and the motion-tracked position in order to provide smooth movement. Also, as discussed above, the actions of block 1012 may be performed repeatedly as multiple location change notifications are transmitted by the target endpoint system. The method 1000 then proceeds to a continuation terminal ("terminal A").

From terminal A (FIG. 10B), the method 1000 proceeds to block 1014, where a physics engine 610 of a detecting endpoint system 404 detects a collision between the target avatar and an object for which the detecting endpoint system 404 has object authority. The object could be any type of object for which the detecting endpoint system 404 has object authority. For example, the object could be a ball or some other projectile whose position is determined according to the simulation conducted by the physics engine 610. As another example, the object could be a hand or other part of an avatar associated with the detecting endpoint system, an object grabbed by the avatar of the detecting endpoint system, or some other object whose position is determined according to a motion sensor device 616 or handheld controller device 618 of the detecting endpoint system 404.

In general, detecting collisions between objects in a shared virtual environment involves determining whether the objects intersect with each other within the space of the shared virtual environment. Collision detection can be implemented in different ways depending on factors such as overall system preferences, bandwidth or processing restrictions, and gameplay design. In some embodiments, collision detection is handled by the physics engine 610, and upon detecting a collision, the physics engine 610 may generate a collision event to be provided to the object behavior engine 601 for processing.

While the decoupling functionality described herein may increase immersiveness and interactivity, in some embodiments it may be desirable to limit its application in order to prevent harassment, to reduce distractions, to implement particular game logic, or for other reasons. Therefore, in some embodiments, in response to determining that the collision event represents a collision between an object that is part of the target avatar and some other object, the object behavior engine 601 may decide whether or not to perform the rest of the method 1000. As several non-limiting examples, the object behavior engine 601 may base the decision of whether or not to perform the rest of the method 1000 based on a type of the colliding object, based on an identity of the user of the detecting endpoint system 404 (e.g., only initiate the behavior of the user of the detecting endpoint system 404 is on a friends list of the user of the target endpoint system 402), or based on a game state (e.g., actually in a game of dodgeball, actually in a boxing match).

Assuming the object behavior engine 601 has decided that the reaction behavior should be performed, the method 1000 proceeds to block 1016, where the detecting endpoint system 404 determines a reaction position of the head of the target avatar based on the collision. The detecting endpoint system 404 may use any suitable technique to determine the reaction position. In some embodiments, the physics engine 610 of the detecting endpoint system 404 may simulate a physical interaction between the object and the head of the target avatar. For example, the object and the head of the target avatar may be assigned mass values and coefficients of restitution, and the physics engine 610 may determine new positions for the head and the object by physically modelling the interaction. The positions of the rest of the avatar may be determined using a ragdoll physics simulation. This could be appropriate in situations where the head collides with an object whose movement is being simulated by the physics engine 610, such as a thrown ball. As another example, the physics engine 610 may cause the position of the head to track a location of the object. This could be appropriate in situations where the head collides with an object whose movement is linked to detected motion, such as a hand of an avatar. For example, in a boxing game, instead of having the hand of a punching avatar clip through the head of the target avatar, this technique could cause the head of the target avatar to be pushed back by the hand of the punching avatar. In some embodiments, the reaction position of the head of the target avatar may be determined without using the physics engine 610. For example, a predetermined animation may be provided and used in response to a collision, and the reaction position may be based on the predetermined animation. Such embodiments could save processing time in having the physics engine 610 determine each reaction position, and could also save network bandwidth in that an identification of the predetermined animation could be transmitted instead of a plurality of positions, if the predetermined animation is already stored at each of the endpoint systems 402, 404, 406.

Next, at block 1018, an object authority engine 606 of the detecting endpoint system 404 transmits a second location change notification for the head of the target avatar based on the reaction position. Again, any suitable technique for transmitting the notification may be used, including but not limited to the method of transmitting notifications to other endpoint systems via a communication relay server 410 as illustrated in FIG. 9. The head of the target avatar is discussed above, primarily because the head is the element of the target avatar that is normally coupled to the viewpoint. However, in some embodiments, the second location change notification may also include positions for other avatar parts as well (including, but not limited to, a torso, at least one hand, and/or at least one leg), or for the avatar as a whole.

At block 1020, the observing endpoint system 406 receives the second location change notification, and at block 1022, the environment presentation engine 604 of the observing endpoint system 406 animates the head of the target avatar from the motion-tracked position to the reaction position. In some embodiments, the animation may include interpolating positions for the head of the target avatar between the motion-tracked position to the reaction position in order to provide an appearance of smooth movement.

Because a given endpoint system has object authority by default for its own avatar, in some embodiments the observing endpoint system 406 may be receiving location change notifications that refer to the head of the target avatar from both the detecting endpoint system 404 and the target endpoint system 402. Hence, the observing endpoint system 406 will have to decide which location change notifications to animate. In some embodiments, the observing endpoint system 406 may wait to receive a consent notification from the target endpoint system 402 to allow the second location change notification to temporarily override the location change notifications from the target endpoint system 402 for a predetermined amount of time. In some embodiments, the detecting endpoint system 404 may transmit an authority transfer notification before transmitting the second location change notification, which may later be overridden by an authority transfer notification from the target endpoint system 402. In some embodiments, the observing endpoint system 406 may itself verify that conditions (such as the collision, the game state, and the friend status) have been met to allow the detecting endpoint system 404 to affect the rendered position of the head of the avatar.

At block 1024, the environment presentation engine of the target endpoint system 402 receives the second location change notification but does not move the viewpoint to the reaction position. Normally, the viewpoint position is always tied to the position of the head of the avatar. By having the target endpoint system 402 ignore the second location change notification, the viewpoint position will be temporarily decoupled from the location of the avatar head. To some extent, this breaks synchronization of the simulations of the shared virtual environment between the endpoints, because the target endpoint system 402 will no longer have the same state for its viewpoint position as the other endpoint systems 404, 406 have for its avatar head. Nevertheless, this temporary desynchronization allows the first user to still have an immersive experience because they are not disoriented by having their viewpoint moved, and also allows other users to have a more interactive experience because they can see effects of actions on the first avatar.

The method 1000 then proceeds to a decision block 1026, where a determination is made regarding whether the detecting endpoint system 404 is done determining reaction positions. In some embodiments, the detecting endpoint system 404 may determine reaction positions for a predetermined amount of time after detecting the collision. In some embodiments, the detecting endpoint system 404 may determine a predetermined number of reaction positions before stopping. In some embodiments, the detecting endpoint system 404 may generate reaction positions based on an animation script, and would be done determining reaction positions once the animation script has been completed.

If the detecting endpoint system 404 has further reaction positions to generate, then the result of decision block 1026 is NO, and the method 1000 loops back to block 1016 to generate more reaction positions. Otherwise, the result of decision block 1026 is YES, and the method 1000 proceeds to procedure block 1028, where the object authority engine 606 of the target endpoint system 402 transmits a third location change notification for the head of the target avatar based on the motion-tracked position. Again, any suitable technique for transmitting the notification may be used, including but not limited to the method of transmitting notifications to other endpoint systems via a communication relay server 410 as illustrated in FIG. 9. In some embodiments, the target endpoint system 402 may continue to track the position of the head-mounted display device 614 between blocks 1006-1028. Accordingly, the third location change notification may include a different position than the first location change notification.

At block 1030, the observing endpoint system 406 animates the head of the target avatar to the motion-tracked position from the reaction position based on the third location change notification. As discussed above, the environment presentation engine 604 may interpolate positions for the head of the target avatar between the reaction position to the motion-tracked position to provide an appearance of smooth motion. Once this animation is completed, the viewpoint is again coupled to the head of the avatar, and the simulations on all of the endpoint systems 402, 404, 406 are again synchronized with each other. The method 1000 then proceeds to an end block and terminates.

As discussed above and as illustrated in FIG. 4, in some embodiments the target endpoint system 402, the detecting endpoint system 404, and the observing endpoint system 406 may be separate from each other. In some embodiments, a single endpoint system may act as the target endpoint system 402 and the detecting endpoint system 404. In some embodiments, a single endpoint system may act as the detecting endpoint system 404 and the observing endpoint system 406. In embodiments wherein a single endpoint system provides the functionality of two of these described endpoint systems, one of ordinary skill in the art will understand that, instead of notifications being transmitted and received between the separate endpoint systems over the network 90 as described above, events or other notifications may be generated and passed between engines, subroutines, or other components of the single endpoint system without transiting through the network 90.

One of skill in the art will recognize that, in the description above, like names refer to like elements, even if numbering is different. For example, the target endpoint system, the detecting endpoint system, and the observing endpoint system discussed in FIGS. 10A-10B are all examples of an endpoint system 600 as illustrated in FIG. 6. Likewise, the endpoint systems in FIG. 4 are also examples of an endpoint system 600.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of temporarily decoupling a position of a viewpoint from a position of a head of a target avatar in a shared virtual environment, the method comprising:
   presenting, by a target endpoint system, the shared virtual environment from a viewpoint at a motion-tracked position, wherein the motion-tracked position corresponds to a position of a head-mounted display device detected by a motion sensor device of the target endpoint system;
   presenting, by an observing endpoint system, the shared virtual environment including the head of the target avatar at the motion-tracked position that corresponds to the position of the head-mounted display device detected by the motion sensor device of the target endpoint system;
   transmitting, by a detecting endpoint system, a first location change notification that includes a reaction position for the head of the target avatar;
   in response to receiving the first location change notification, animating, by the observing endpoint system, the head of the target avatar from the motion-tracked position to the reaction position; and
   in response to receiving the first location change notification, maintaining, by the target endpoint system, the viewpoint at the motion-tracked position instead of moving the viewpoint from the motion-tracked position to the reaction position.

2. The method of claim 1, wherein transmitting, by the detecting endpoint system, the first location change notification that includes the reaction position for the head of the target avatar comprises:
   detecting, by the detecting endpoint system, a collision between the target avatar and an object for which the detecting endpoint system has object authority.

3. The method of claim 2, wherein the detecting endpoint system is the target endpoint system.

4. The method of claim 2, wherein the detecting endpoint system is the observing endpoint system.

5. The method of claim 2, wherein the detecting endpoint system is separate from the target endpoint system.

6. The method of claim 5, wherein the object is a portion of an avatar associated with the detecting endpoint system.

7. The method of claim 2, wherein transmitting, by the detecting endpoint system, the first location change notification that includes the reaction position for the head of the target avatar further comprises determining, by the detecting endpoint system, the reaction position for the head of the target avatar based on the collision.

8. The method of claim 7, wherein determining the reaction position for the head of the target avatar based on the collision includes at least one of:
   determining the reaction position using a physics simulation of a force of the collision; and determining the reaction position using a predetermined animation sequence triggered by the collision.

9. The method of claim 1, further comprising presenting, by the target endpoint system, a collision notification in response to receiving the first location change notification.

10. The method of claim 1, further comprising:
in response to receiving the first location change notification, transmitting, by the target endpoint system, a second location change notification that includes the motion-tracked position; and
in response to receiving the second location change notification, animating, by the observing endpoint system, the head of the target avatar from the reaction position to the motion-tracked position.

11. A method executed by a computing device of an endpoint system, comprising:
causing, by the computing device, a head-mounted display device to present a shared virtual environment from a viewpoint rendered at a motion-tracked position, wherein the motion-tracked position corresponds to detected positions of the head-mounted display device generated by one or more motion sensors of the endpoint system;
transmitting, by the computing device, at least one location change notification to cause at least one other endpoint system to present a head of an avatar associated with the endpoint system at the motion-tracked position that corresponds to the detected positions of the head-mounted display device generated by the one or more motion sensors of the endpoint system;
receiving, by the computing device, a location change notification from a detecting endpoint system, wherein the location change notification includes a reaction position for the head of the avatar that is different from the motion-tracked position; and
in response to receiving the location change notification from the detecting endpoint system:
maintaining, by the computing device, the viewpoint at the motion-tracked position instead of moving the viewpoint from the motion-tracked position to the reaction position.

12. The method claim 11, further comprising causing, by the computing device, the endpoint system to present a collision notification in response to receiving the at least one location change notification from the detecting endpoint system.

13. The method of claim 11, further comprising, in response to receiving the at least one location change notification from the detecting endpoint system, transmitting, by the computing device, a location change notification that includes the motion-tracked position to cause the at least one other endpoint system to animate the head of the avatar from the reaction position to the motion-tracked position.

14. A method executed by a computing device of a detecting endpoint system, the method comprising:
receiving, by the computing device from a target endpoint system, a first location change notification that indicates a motion-tracked position within a shared virtual environment at which to present a head of an avatar associated with the target endpoint system, wherein the motion-tracked position corresponds to a position of a head-mounted display device detected by a motion sensor device of the target endpoint system;
detecting, by the computing device, a collision between the avatar and an object for which the detecting endpoint system has object authority; and
transmitting, by the computing device, a second location change notification that includes a reaction position for the head.

15. The method of claim 14, wherein the detecting endpoint system is separate from the target endpoint system.

16. The method of claim 15, further comprising:
presenting, by the computing device, a shared virtual environment including the head at the motion-tracked position;
animating, by the computing device, the head from the motion-tracked position to the reaction position;
receiving, by the computing device from the target endpoint system, a third location change notification that indicates the motion-tracked position; and
animating, by the computing device, the head from the reaction position to the motion-tracked position.

17. The method of claim 15, wherein the object is a portion of an avatar associated with the detecting endpoint system.

18. The method of claim 14, wherein transmitting, by the computing device, the second location change notification that includes the reaction position for the head comprises determining, by the computing device, the reaction position for the head based on the collision.

19. The method of claim 18, wherein determining the reaction position for the head based on the collision includes at least one of:
determining the reaction position using a physics simulation of a force of the collision; and
determining the reaction position using a predetermined animation sequence triggered by the collision.

\* \* \* \* \*